United States Patent
Frandsen

(10) Patent No.: US 6,527,750 B1
(45) Date of Patent: Mar. 4, 2003

(54) MEDICATION ADMINISTRATION SYSTEM

(76) Inventor: Daniel W. Frandsen, P.O. Box 110, Minersville, UT (US) 84752

( * ) Notice: Subject to any disclaimer, the term of this patent is extended or adjusted under 35 U.S.C. 154(b) by 0 days.

(21) Appl. No.: 09/876,967

(22) Filed: Jun. 8, 2001

(51) Int. Cl.[7] ............................................... A61M 5/00
(52) U.S. Cl. ....................................... 604/191; 606/116
(58) Field of Search ................................ 604/130, 152, 604/191, 116, 117, 140, 141, 411, 412, 240, 242, 243, 256, 257, 259; 224/259, 267, 639, 627, 637; 606/116

(56) References Cited

U.S. PATENT DOCUMENTS

| | | | | |
|---|---|---|---|---|
| 5,041,105 A | * | 8/1991 | D'Alo et al. ................ | 604/411 |
| 5,961,494 A | * | 10/1999 | Hogan ......................... | 604/191 |
| 5,964,736 A | * | 10/1999 | Lane ........................... | 604/207 |
| 6,196,436 B1 | * | 3/2001 | Williams .................... | 224/581 |
| 6,364,186 B1 | * | 4/2002 | Gilmour et al. ............ | 224/625 |

* cited by examiner

*Primary Examiner*—Manuel Mendez
*Assistant Examiner*—Mark Han

(57) ABSTRACT

A medication administration system includes an application assembly having a syringe assembly coupled within the application assembly. A trigger handle of the application assembly is operationally coupled to the syringe assembly such that actuation of the trigger handle actuates the syringe assembly. The syringe assembly is for administering medication to an animal. A needle assembly is in fluid communication with the syringe assembly. The needle assembly is for piercing the hide of the animal such that the syringe assembly is adapted for applying medication to a blood stream of the animal. A sling assembly is for carrying a medication supply assembly. The sling assembly is adapted for selectively coupling to a user. The medication supply assembly is in fluid communication with the syringe assembly such that the medication supply assembly is adapted for supplying medication to the syringe assembly.

19 Claims, 5 Drawing Sheets

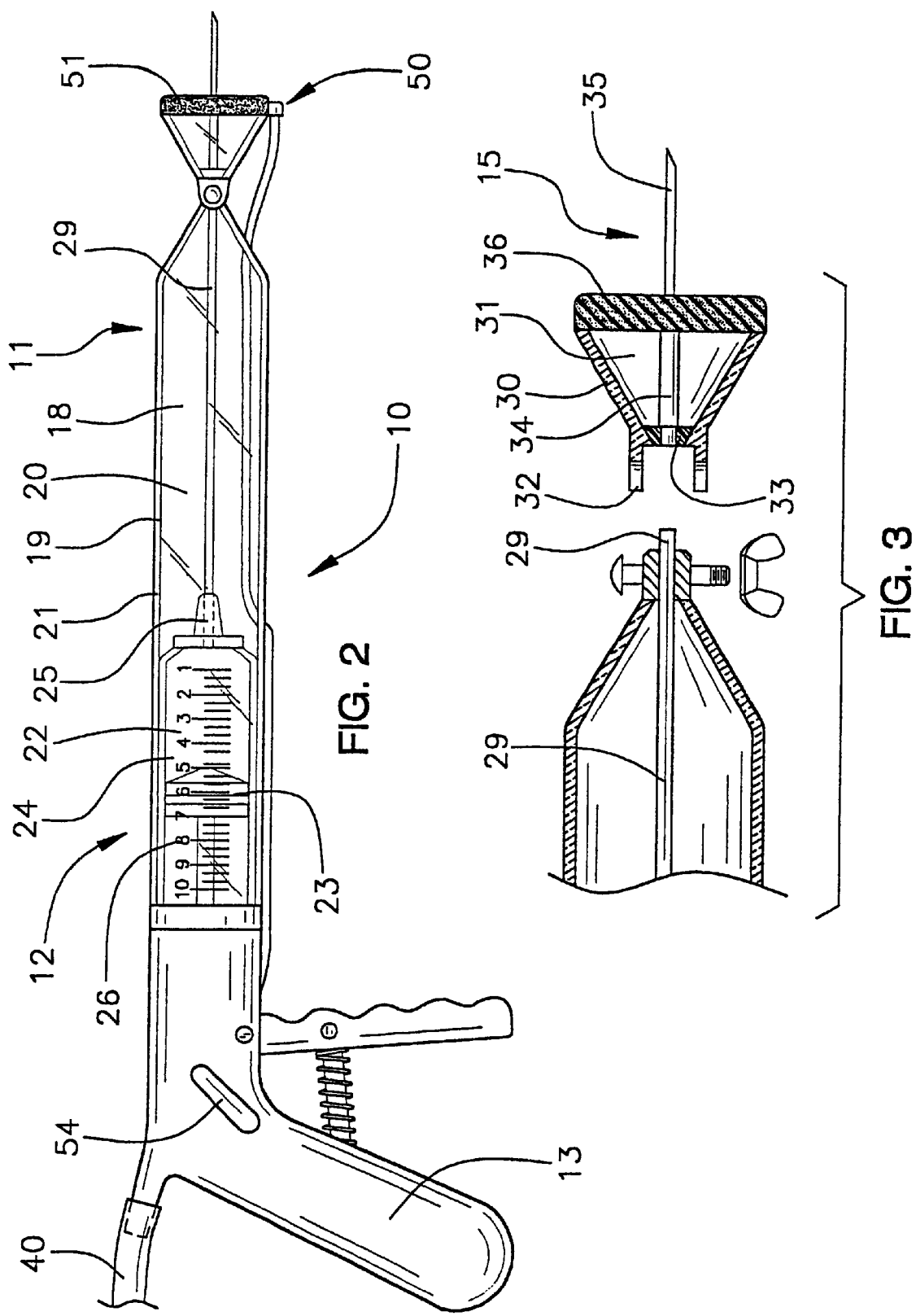

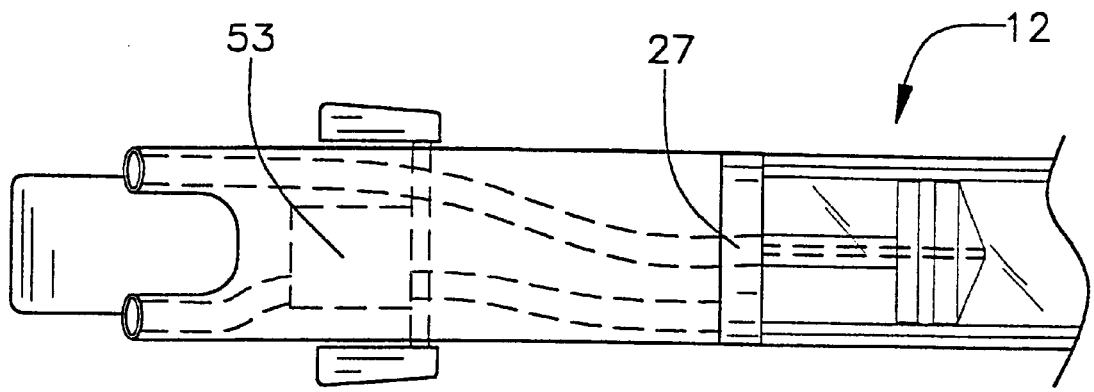
FIG. 4
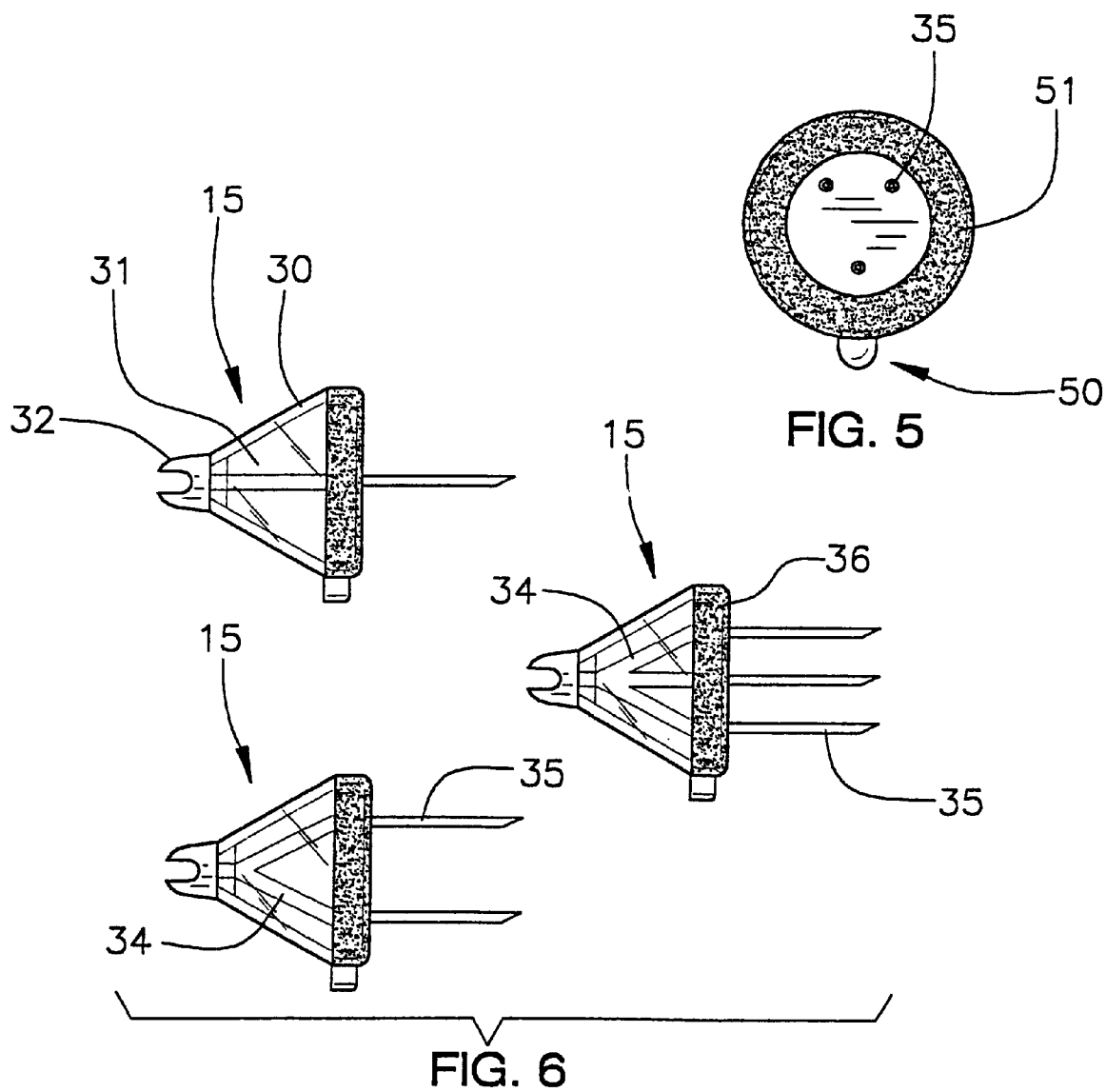
FIG. 5
FIG. 6

MEDICATION ADMINISTRATION SYSTEM

BACKGROUND OF THE INVENTION

1. Field of the Invention

The present invention relates to medication administration systems and more particularly pertains to a new medication administration system for allowing a user to administer shots of medication to animals while maintaining a safe distance.

2. Description of the Prior Art

The use of medication administration systems is known in the prior art. More specifically, medication administration systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,780,734; U.S. Pat. No. 3,880,162; U.S. Pat. No. 5,961,494; U.S. Pat. No. 3,114,370; U.S. Pat. No. 4,214,490; and U.S. Pat. No. Des. 188,927.

While these devices fulfill their respective, particular objectives and requirements, the aforementioned patents do not disclose a new medication administration system. The inventive device includes an application assembly that has a syringe assembly that is coupled within the application assembly. A trigger handle of the application assembly is operationally coupled to the syringe assembly such that actuation of the trigger handle actuates the syringe assembly. The syringe assembly is adapted for administering medication to the animal when the syringe assembly is actuated by the trigger handle. A needle assembly is coupled to an end of the application assembly. The needle assembly is in fluid communication with the syringe assembly. The needle assembly is adapted for piercing the hide of an animal such that the syringe assembly is adapted for applying medication to a blood stream of the animal when the syringe assembly is actuated by the trigger handle. A sling assembly is for carrying a medication supply assembly. The sling assembly is adapted for selectively coupling to a user. The medication supply assembly is in fluid communication with the syringe assembly such that the medication supply assembly is adapted for supplying medication to the syringe assembly.

In these respects, the medication administration system according to the present invention substantially departs from the conventional concepts and designs of the prior art, and in so doing provides an apparatus primarily developed for the purpose of allowing a user to administer shots of medication to animals while maintaining a safe distance.

SUMMARY OF THE INVENTION

In view of the foregoing disadvantages inherent in the known types of medication administration systems now present in the prior art, the present invention provides a new medication administration system construction wherein the same can be utilized for allowing a user to administer shots of medication to animals while maintaining a safe distance.

The general purpose of the present invention, which will be described subsequently in greater detail, is to provide a new medication administration system apparatus and method which has many of the advantages of the medication administration systems mentioned heretofore and many novel features that result in a new medication administration system which is not anticipated, rendered obvious, suggested, or even implied by any of the prior art medication administration systems, either alone or in any combination thereof.

To attain this, the present invention generally comprises an application assembly that has a syringe assembly that is coupled within the application assembly. A trigger handle of the application assembly is operationally coupled to the syringe assembly such that actuation of the trigger handle actuates the syringe assembly. The syringe assembly is adapted for administering medication to the animal when the syringe assembly is actuated by the trigger handle. A needle assembly is coupled to an end of the application assembly. The needle assembly is in fluid communication with the syringe assembly. The needle assembly is adapted for piercing the hide of an animal such that the syringe assembly is adapted for applying medication to a blood stream of the animal when the syringe assembly is actuated by the trigger handle. A sling assembly is for carrying a medication supply assembly. The sling assembly is adapted for selectively coupling to a user. The medication supply assembly is in fluid communication with the syringe assembly such that the medication supply assembly is adapted for supplying medication to the syringe assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new medication administration system apparatus and method which has many of the advantages of the medication administration systems mentioned heretofore and many novel features that result in a new medication administration system which is not anticipated, rendered obvious, suggested, or even implied by any of the prior art medication administration systems, either alone or in any combination thereof.

It is another object of the present invention to provide a new medication administration system which may be easily and efficiently manufactured and marketed.

It is a further object of the present invention to provide a new medication administration system which is of a durable and reliable construction.

An even further object of the present invention is to provide a new medication administration system which is susceptible of a low cost of manufacture with regard to both materials and labor, and which accordingly is then susceptible of low prices of sale to the consuming public, thereby making such medication administration system economically available to the buying public.

Still yet another object of the present invention is to provide a new medication administration system which provides in the apparatuses and methods of the prior art some of the advantages thereof, while simultaneously overcoming some of the disadvantages normally associated therewith.

Still another object of the present invention is to provide a new medication administration system for allowing a user to administer shots of medication to animals while maintaining a safe distance.

Yet another object of the present invention is to provide a new medication administration system which includes an application assembly that has a syringe assembly that is coupled within the application assembly. A trigger handle of the application assembly is operationally coupled to the syringe assembly such that actuation of the trigger handle actuates the syringe assembly. The syringe assembly is adapted for administering medication to the animal when the syringe assembly is actuated by the trigger handle. A needle assembly is coupled to an end of the application assembly. The needle assembly is in fluid communication with the syringe assembly. The needle assembly is adapted for piercing the hide of an animal such that the syringe assembly is adapted for applying medication to a blood stream of the animal when the syringe assembly is actuated by the trigger handle. A sling assembly is for carrying a medication supply assembly. The sling assembly is adapted for selectively coupling to a user. The medication supply assembly is in fluid communication with the syringe assembly such that the medication supply assembly is adapted for supplying medication to the syringe assembly.

Still yet another object of the present invention is to provide a new medication administration system that would be its long reach, portability, large capacity, and marking capabilities. The long reach of this product could greatly reduce the users risk of injury when attempting to give injections to livestock.

Even still another object of the present invention is to provide a new medication administration system that includes an integral marking system that would eliminate the need to perform this task as a separate step and could, consequently, provide a higher degree of accuracy.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the present invention.

FIG. 3 is a cross-sectional view of the present invention.

FIG. 4 is a side view of the present invention.

FIG. 5 is an end view of the present invention.

FIG. 6 is a side view of the present invention.

DESCRIPTION OF THE PREFERRED EMBODIMENT

Figure 1:
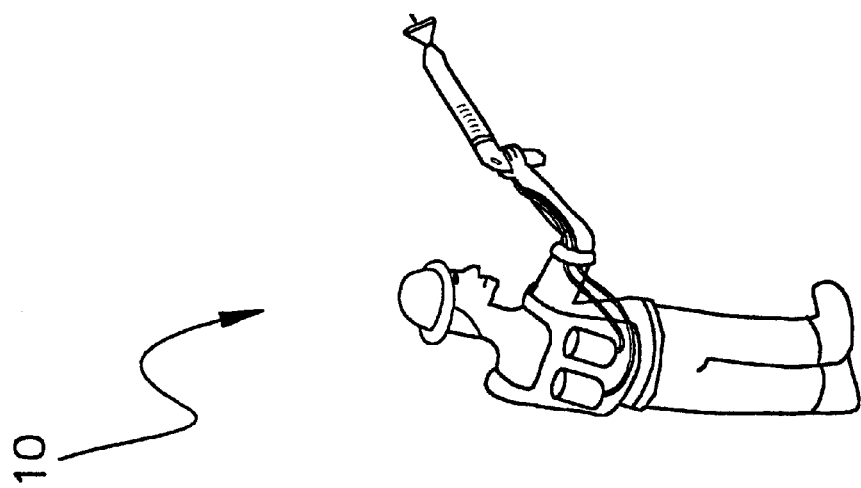
FIG. 1 is a perspective view of a new medication administration system according to the present invention.
Figure 7:
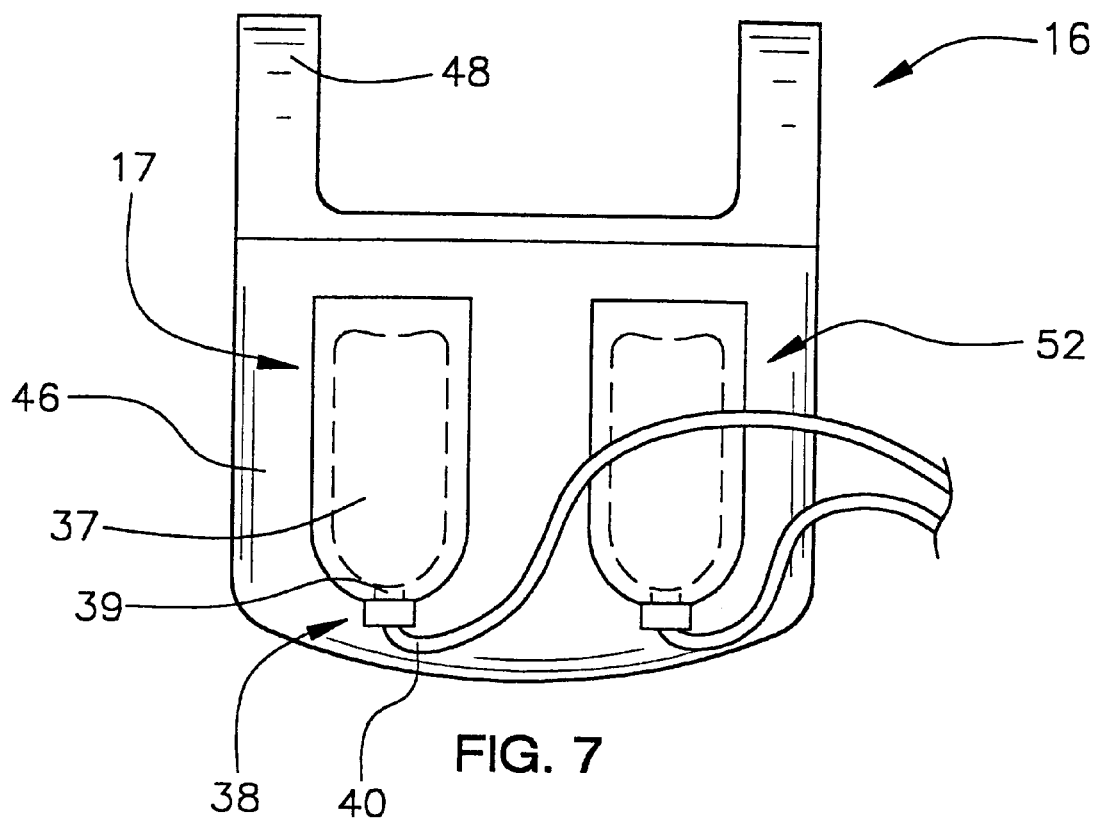
FIG. 7 is a rear view of the present invention.
Figure 8:
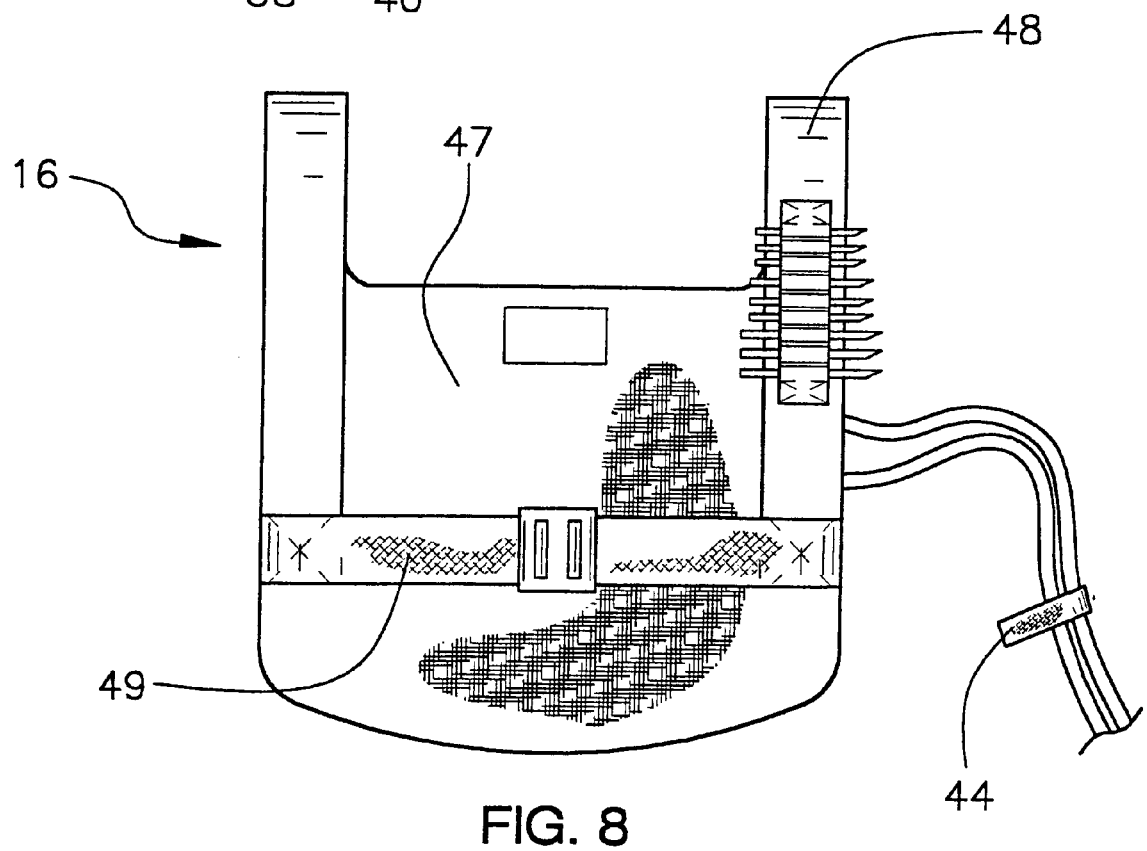
FIG. 8 is a front view of the present invention.
Figure 9:
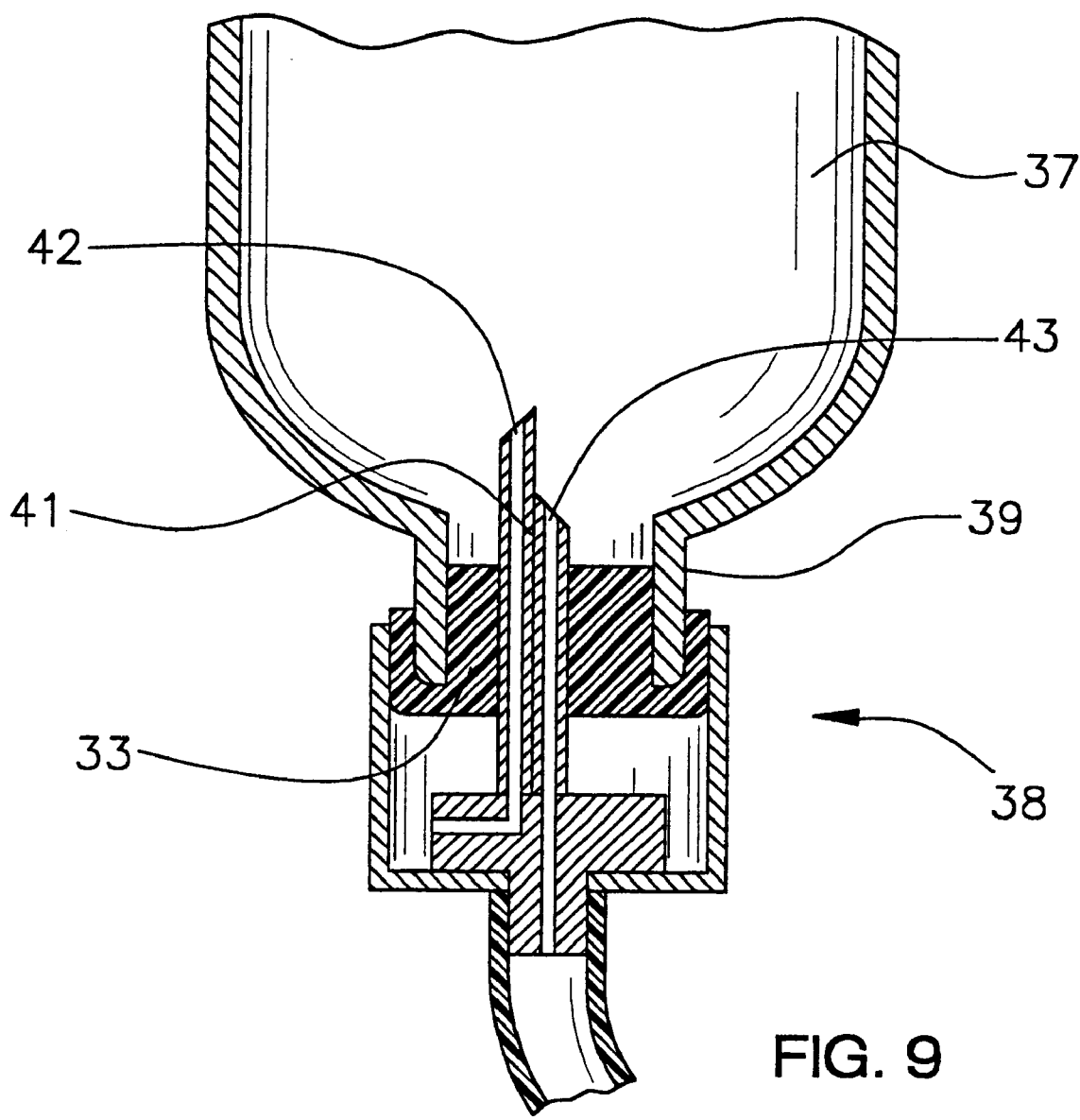
FIG. 9 is a cross-sectional view of the present invention.

With reference now to the drawings, and in particular to FIGS. 1 through 9 thereof, a new medication administration system embodying the principles and concepts of the present invention and generally designated by the reference numeral 10 will be described.

As best illustrated in FIGS. 1 through 9, the medication administration system 10 generally includes an application assembly 11 that has a syringe assembly 12 that is coupled within the application assembly 11. A trigger handle 13 of the application assembly is operationally coupled to the syringe assembly 12 such that actuation of the trigger handle 13 actuates the syringe assembly 12. The syringe assembly 12 is adapted for administering medication to the animal 14 when the syringe assembly 12 is actuated by the trigger handle 13. A needle assembly 15 is coupled to an end of the application assembly 11. The needle assembly 15 is in fluid communication with the syringe assembly 12. The needle assembly 15 is adapted for piercing the hide of an animal 14 such that the syringe assembly 12 is adapted for applying medication to a blood stream of the animal 14 when the syringe assembly 12 is actuated by the trigger handle 13. A sling assembly 16 is for carrying a medication supply assembly 17. The sling assembly 16 is adapted for selectively coupling to a user. The medication supply assembly 17 is in fluid communication with the syringe assembly 12 such that the medication supply assembly 17 is adapted for supplying medication to the syringe assembly 12.

The application assembly 11 has a containment portion 18. The containment portion 18 has a perimeter wall 19 that defines an interior space 20. The syringe assembly 12 is positioned within the containment portion 18. The perimeter wall 19 of the containment portion 18 includes a transparent material 21 such that the syringe assembly 12 is adapted for to be viewed by a user. The perimeter wall 19 of the containment portion 18 is for identifying an amount of the medication in the syringe assembly 12.

The syringe assembly 12 has a body member 22 and a plunger 23. The body member 22 has a bore 24 through the body member 22. The plunger 23 is slidably insertable into the bore 24 of the body member 22. An end of the body member 22 has an orifice 25 through the end of the body member 22. The bore 24 of the body member 22 is in fluid communication with the needle assembly 15. The plunger 23 is coupled to the trigger handle 13 such that the plunger 23 is adapted to force the medication out of the bore 24 of the body member 22 when the trigger handle 13 is actuated. The body member 22 of the syringe assembly 12 has measuring indicia 26 marked on the body member 22. The measuring indicia 26 is adapted for indicating an amount of the medication in the body member 22 of the syringe assembly 12. The plunger 23 of the syringe assembly 12 has a supply aperture 27 that extends through the plunger 23. The supply aperture 27 is in fluid communication with the medication supply assembly 17 and the bore 24 of the body member 22 of the syringe assembly 12. The supply aperture 27 is adapted for supplying medication to the bore 24 of the body member 22 when the plunger 23 is drawn back through the bore 24 of the body member 22 of the syringe assembly 12.

The needle assembly 15 is pivotally coupled to the end of the application assembly 11 such that the pivoting of the needle assembly 15 is adapted for preventing damage to the animal 14 when the animal 14 moves when the needle assembly 15 is inserted through the hide of the animal 14. A flexible medical tube 29 is fluidly coupled between the syringe assembly 12 and the needle assembly 15 such that the medical tube 29 is bendable for continuing fluid communication between the syringe assembly 12 and the needle assembly 15 when the needle assembly 15 is pivoted with respect to the application assembly 11. The needle assembly 15 has an outer wall 30 defining an inner cavity 31. A first end 32 of the needle assembly 15 has a sealing member 33 positioned within the inner cavity 31. The sealing member 33 is for sealing around the medical tube 29 when the needle assembly 15 is coupled to the application assembly 11. The needle assembly 15 has at least one needle conduit 34 and at least one needle 35. The needle conduit 34 is for extending through the inner cavity 31 of the needle assembly 15. The needle 35 is removably insertable into the needle conduit 34 through a front wall 36 of the needle assembly 15. The needle 35 is adapted for piercing the hide of the animal 14. The needle conduit 34 is for directing medication for the syringe assembly 12 to the needle 35 such that the needle 35 is adapted for administering the medication to the animal 14 when the needle 35 has pierced the hide of the animal 14.

The medication supply assembly 17 has a medication container 37 and a medication cap assembly 38. The medication container 37 is adapted for storing the medication. The medication cap assembly 38 is coupled to a neck 39 of the medication container 37. A medication conduit 40 is coupled between the medication cap assembly 38 of the medication supply assembly 17 and the syringe assembly 12 such that the medication conduit 40 is adapted for providing fluid communication between the medication container 37 and the syringe assembly 12.

The medication cap assembly 38 has a piercing portion 41. The piercing portion 41 of the medication cap assembly 38 is adapted for piercing through a sealing member 33 in the neck 39 of the medication container 37. The medication cap assembly 38 has an air aperture 42 and a medication aperture 43. The medication aperture 43 is adapted for providing fluid communication between the medication in the medication container 37 and the medication conduit 40. The air aperture 42 is for providing air to the medication container 37 such that the air aperture 42 prevents a vacuum from form in the medication container 37.

A plurality of securing straps 44 is coupled to the medication conduit 40. Each of the securing straps 44 is adapted to be secured to the medication conduit 40 to an arm of the user such that the securing straps 44 are for preventing the medication conduit 40 from becoming entangled when the application assembly 11 is being used by the user.

The sling assembly 16 has at least one pocket 46. The pocket 46 is adapted for securing the medication supply assembly 17 to the user. The sling assembly 16 has a back panel 47 and a pair of shoulder straps 48. The shoulder straps 48 are adapted for extending over shoulders of the user such that the back panel 47 abuts a back of the user. The pocket 46 is coupled to the back panel 47 such that the medication supply assembly 17 is adapted for is supported on the back of the user. The sling assembly 16 has a belt 49 that is coupled to the back panel 47 of the sling assembly 16. The belt 49 is adapted for extending around a waist of the user such that the back panel 47 is secured to the waist of the user.

A marking assembly 50 is coupled to the application assembly 11. The marking assembly 50 is adapted for putting an identifying mark on the animal when the medication has been administered to the animal. The marking assembly 50 has an inking pad 51 coupled to the needle assembly 15. The inking pad 51 is fluidly coupled to an ink supply assembly 52 coupled to the sling assembly 16. The ink supply assembly 52 is adapted for storing a quantity of ink. The inking pad 51 is adapted for pressing against the hide of the animal 14 such that the inking pad 51 leaves a marking in ink on the hide of the animal 14 for indicating the animal 14 has been medicated.

An ink pump 53 is coupled to the application assembly 11. The ink pump 53 is fluidly coupled between the inking pad 51 and the ink supply assembly 52 such that the ink pump 53 is adapted for pumping ink from the ink supply assembly 52 to the inking pad 51. At least one switch 54 is coupled to the application assembly 11. The switch 54 is operationally coupled to the ink pump 53. The switch 54 is adapted for actuation by the user such that actuation of the switch 54 actuates the ink pump 53 for pumping ink to the inking pad 51.

In use, a user would strap on the backpack assembly. The user could then activate the trigger handle of the application assembly such that actuation of the trigger handle actuates the syringe assembly. The syringe assembly is adapted for administering medication to the animal when the syringe assembly is actuated by the trigger handle. A needle assembly is coupled to an end of the application assembly. The needle assembly is in fluid communication with the syringe assembly. The needle assembly is adapted for piercing the hide of an animal such that the syringe assembly is adapted for applying medication to a blood stream of the animal when the syringe assembly is actuated by the trigger handle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A medication administration system for administrating medication to an animal, the medication administration system comprising:

an application assembly having a syringe assembly being coupled within said application assembly, a trigger handle of said application assembly being operationally coupled to said syringe assembly such that actuation of said trigger handle actuates said syringe assembly, said syringe assembly being adapted for administering medication to the animal when said syringe assembly is actuated by said trigger handle;

a needle assembly being coupled to an end of said application assembly, said needle assembly being in fluid communication with said syringe assembly, said needle assembly being adapted for piercing the hide of an animal such that said syringe assembly is adapted for applying medication to a blood stream of the animal when said syringe assembly is actuated by said trigger handle;

a sling assembly being for carrying a medication supply assembly, said sling assembly being adapted for selectively coupling to a user, said medication supply assembly being in fluid communication with said syringe assembly such that said medication supply assembly is adapted for supplying medication to said syringe assembly;

said sling assembly having at least one pocket, said pocket being adapted for securing said medication supply assembly to the user; and a marking assembly being coupled to said needle assembly, said marking assembly being adapted for putting an identifying mark on the animal around the area where said needle assembly pierced the hide of the animal when the medication has been administered to the animal for indicating the area where said needle assembly pierced the hide of the animal.

2. The medication administration system as set forth in claim 1, further comprising:

said application assembly having a containment portion, said containment portion having a perimeter wall defining an interior space, said syringe assembly being positioned within said containment portion, said perimeter wall of said containment portion comprising a transparent material such that said syringe assembly is adapted for being viewed by user through said perimeter wall of said containment portion for identifying an amount of the medication in said syringe assembly.

3. The medication administration system as set forth in claim 1, further comprising:

said syringe assembly having a body member and a plunger, said body member having a bore through said body member, said plunger being slidably insertable into said bore of said body member, an end of said body member having an orifice through said end of said body member, said bore of said body member being fluid communication with said needle assembly, said plunger being coupled to said trigger handle such that said plunger is adapted for forcing the medication out of said bore of said body member when said trigger handle is actuated.

4. The medication administration system as set forth in claim 3, further comprising:

said body member of said syringe assembly having measuring indicia marked on said body member, said measuring indicia being adapted for indicating an amount of the medication in said body member of said syringe assembly.

5. The medication administration system as set forth in claim 3, further comprising:

said plunger of said syringe assembly having a supply aperture extending through said plunger, said supply aperture being in fluid communication with said medication supply assembly and said bore of said body member of said syringe assembly, said supply aperture being adapted for supplying medication to said bore of said body member when said plunger is drawn back through said bore of said body member of said syringe assembly.

6. The medication administration system as set forth in claim 1, further comprising:

said needle assembly being pivotally coupled to said end of said application assembly such that pivoting of said needle assembly is adapted for preventing damage to the animal when the animal moves with said needle assembly is inserted through the hide of the animal, a flexible medical tube being fluidly coupled between said syringe assembly and said needle assembly such that said medical tube is bendable for continuing fluid communication between said syringe assembly and said needle assembly when said needle assembly is pivoted with respect to said application assembly.

7. The medication administration system as set forth in claim 6, further comprising:

said needle assembly having a outer wall defining an inner cavity, a first end of said needle assembly having a sealing member positioned within said inner cavity, said sealing member being for sealing around said medical tube when said needle assembly is coupled to said application assembly.

8. The medication administration system as set forth in claim 7, further comprising:

said needle assembly having at least one needle conduit and at least one needle, said needle conduit being for extending through said inner cavity of said needle assembly, said needle being removably insertable into said needle conduit through a front wall of said needle assembly, said needle being adapted for piercing the hide of the animal, said needle conduit being for directing medication for said syringe assembly to said needle such that said needle is adapted for administering the medication to the animal when said needle has pierced the hide of the animal.

9. The medication administration system as set forth in claim 1, further comprising:

said medication supply assembly having a medication container and a medication cap assembly, said medication container being adapted for storing the medication, said medication cap assembly being coupled to a neck of said medication container, a medication conduit being coupled between said medication cap assembly of said medication supply assembly and said syringe assembly such that said medication conduit is adapted for providing fluid communication between said medication container and said syringe assembly.

10. The medication administration system as set forth in claim 9, further comprising:

said medication cap assembly having a piercing portion, said piercing portion of said medication cap assembly being adapted for piercing through a sealing member in said neck of said medication container, said medication cap assembly having an air aperture and a medication aperture, said medication aperture being adapted for providing fluid communication between the medication in said medication container and said medication conduit, said air aperture being for providing air to said medication container such that said air aperture prevents a vacuum from form in said medication container.

11. The medication administration system as set forth in claim 9, further comprising:

a plurality of securing straps being coupled to said medication conduit, each of said securing straps being adapted for securing said medication conduit to an arm of the user such that said securing straps are for preventing said medication conduit from becoming entangled when said application assembly is being used by the user.

12. The medication administration system as set forth in claim 1, further comprising:

said sling assembly having a back panel and a pair shoulder straps, said shoulder straps being adapted for extending over shoulders of the user such that said back panel abuts a back of the user, said pocket being coupled to said back panel such that said medication supply assembly is adapted for being supported on the back of the user.

13. The medication administration system as set forth in claim 12, further comprising:

said sling assembly having a belt being couple to said back panel of said sling assembly, said belt being adapted for extending around a waist of the user such that said back panel is secured to the waist of the user.

14. The medication administration system as set forth in claim 1, further comprising:

said marking assembly having an inking pad coupled to said needle assembly, said inking pad being fluidly coupled to an ink supply assembly coupled to said sling assembly, said ink supply assembly being adapted for storing a quantity of ink, said inking pad being adapted for pressing against the hide of the animal such that said inking pad leaves a marking in ink on the hide of the animal for indicating the animal has been medicated.

15. The medication administration system as set forth in claim 14, further comprising:

an ink pump being coupled to said application assembly, said ink pump being fluidly coupled between said inking pad and said ink supply assembly such that said ink pump is adapted for pumping ink from said ink supply assembly to said inking pad.

16. The medication administration system as set forth in claim 14, further comprising:

at least one switch being coupled to said application assembly, said switch being operationally coupled to said ink pump, said switch being adapted for actuation by the user such that actuation of said switch actuates said ink pump for pumping ink to said inking pad.

17. The medication administration system as set forth in claim 1, further comprising:

wherein said application assembly having a containment portion, said containment portion having a perimeter wall defining an interior space, said syringe assembly being positioned within said containment portion, said perimeter wall of said containment portion comprising a transparent material such that said syringe assembly is adapted for being viewed by user through said perimeter wall of said containment portion for identifying an amount of the medication in said syringe assembly;

wherein said syringe assembly having a body member and a plunger, said body member having a bore through said body member, said plunger being slidably insertable into said bore of said body member, an end of said body member having an orifice through said end of said body member, said bore of said body member being fluid communication with said needle assembly, said plunger being coupled to said trigger handle such that said plunger is adapted for forcing the medication out of said bore of said body member when said trigger handle is actuated;

wherein said body member of said syringe assembly having measuring indicia marked on said body member, said measuring indicia being adapted for indicating an amount of the medication in said body member of said syringe assembly;

wherein said plunger of said syringe assembly having a supply aperture extending through said plunger, said supply aperture being in fluid communication with said medication supply assembly and said bore of said body member of said syringe assembly, said supply aperture being adapted for supplying medication to said bore of said body member when said plunger is drawn back through said bore of said body member of said syringe assembly;

wherein said needle assembly being pivotally coupled to said end of said application assembly such that pivoting of said needle assembly is adapted for preventing damage to the animal when the animal moves with said needle assembly is inserted through the hide of the animal, a flexible medical tube being fluidly coupled between said syringe assembly and said needle assembly such that said medical tube is bendable for continuing fluid communication between said syringe assembly and said needle assembly when said needle assembly is pivoted with respect to said application assembly;

wherein said needle assembly having a outer wall defining an inner cavity, a first end of said needle assembly having a sealing member positioned within said inner cavity, said sealing member being for sealing around said medical tube when said needle assembly is coupled to said application assembly;

wherein said needle assembly having at least one needle conduit and at least one needle, said needle conduit being for extending through said inner cavity of said needle assembly, said needle being removably insertable into said needle conduit through a front wall of said needle assembly, said needle being adapted for piercing the hide of the animal, said needle conduit being for directing medication for said syringe assembly to said needle such that said needle is adapted for administering the medication to the animal when said needle has pierced the hide of the animal;

wherein said medication supply assembly having a medication container and a medication cap assembly, said medication container being adapted for storing the medication, said medication cap assembly being coupled to a neck of said medication container, a medication conduit being coupled between said medication cap assembly of said medication supply assembly and said syringe assembly such that said medication conduit is adapted for providing fluid communication between said medication container and said syringe assembly;

wherein said medication cap assembly having a piercing portion, said piercing portion of said medication cap assembly being adapted for piercing through a sealing member in said neck of said medication container, said medication cap assembly having an air aperture and a medication aperture, said medication aperture being adapted for providing fluid communication between the medication in said medication container and said medication conduit, said air aperture being for providing air to said medication container such that said air aperture prevents a vacuum from form in said medication container;

wherein a plurality of securing straps being coupled to said medication conduit, each of said securing straps being adapted for securing said medication conduit to an arm of the user such that said securing straps are for preventing said medication conduit from becoming entangled when said application assembly is being used by the user;

wherein said sling assembly having a back panel and a pair shoulder straps, said shoulder straps being adapted for extending over shoulders of the user such that said back panel abuts a back of the user, said pocket being coupled to said back panel such that said medication supply assembly is adapted for being supported on the back of the user;

wherein said sling assembly having a belt being couple to said back panel of said sling assembly, said belt being adapted for extending around a waist of the user such that said back panel is secured to the waist of the user;

wherein said marking assembly having an inking pad coupled to said needle assembly, said inking pad being fluidly coupled to an ink supply assembly coupled to said sling assembly, said ink supply assembly being adapted for storing a quantity of ink, said inking pad being adapted for pressing against the hide of the animal such that said inking pad leaves a marking in ink on the hide of the animal for indicating the animal has been medicated;

wherein an ink pump being coupled to said application assembly, said ink pump being fluidly coupled between said inking pad and said ink supply assembly such that said ink pump is adapted for pumping ink from said ink supply assembly to said inking pad;

wherein at least one switch being coupled to said application assembly, said switch being operationally coupled to said ink pump, said switch being adapted for actuation by the user such that actuation of said switch actuates said ink pump for pumping ink to said inking pad.

18. A medication administration system for administrating medication to an animal, the medication administration system comprising:

an application assembly having a syringe assembly being coupled within said application assembly, a trigger handle of said application assembly being operationally coupled to said syringe assembly such that actuation of said trigger handle actuates said syringe assembly, said syringe assembly being adapted for administering medication to the animal when said syringe assembly is actuated by said trigger handle;

a needle assembly being coupled to an end of said application assembly, said needle assembly being in fluid communication with said syringe assembly, said needle assembly being adapted for piercing the hide of an animal such that said syringe assembly is adapted for applying medication to a blood stream of the animal when said syringe assembly is actuated by said trigger handle;

a sling assembly being for carrying a medication supply assembly, said sling assembly being adapted for selectively coupling to a user, said medication supply assembly being in fluid communication with said syringe assembly such that said medication supply assembly is adapted for supplying medication to said syringe assembly;

said needle assembly being pivotally coupled to said end of said application assembly such that pivoting of said needle assembly is adapted for preventing damage to the animal when the animal moves with said needle assembly is inserted through the hide of the animal, a flexible medical tube being fluidly coupled between said syringe assembly and said needle assembly such that said medical tube is bendable for continuing fluid communication between said syringe assembly and said needle assembly when said needle assembly is pivoted with respect to said application assembly; and a marking assembly being coupled to said needle assembly, said marking assembly being adapted for putting an identifying mark on the animal around the area where said needle assembly pierced the hide of the animal when the medication has been administered to the animal for indicating the area where said needle assembly pierced the hide of the animal.

19. A medication administration system for administrating medication to an animal, the medication administration system comprising:

an application assembly having a syringe assembly being coupled within said application assembly, a trigger handle of said application assembly being operationally coupled to said syringe assembly such that actuation of said trigger handle actuates said syringe assembly, said syringe assembly being adapted for administering medication to the animal when said syringe assembly is actuated by said trigger handle;

a needle assembly being coupled to an end of said application assembly, said needle assembly being in fluid communication with said syringe assembly, said needle assembly being adapted for piercing the hide of an animal such that said syringe assembly is adapted for applying medication to a blood stream of the animal when said syringe assembly is actuated by said trigger handle;

a sling assembly being for carrying a medication supply assembly, said sling assembly being adapted for selectively coupling to a user, said medication supply assembly being in fluid communication with said syringe assembly such that said medication supply assembly is adapted for supplying medication to said syringe assembly;

said medication supply assembly having a medication container and a medication cap assembly, said medication container being adapted for storing the medication, said medication cap assembly being coupled to a neck of said medication container, a medication conduit being coupled between said medication cap assembly of said medication supply assembly and said syringe assembly such that said medication conduit is adapted for providing fluid communication between said medication container and said syringe assembly; and a marking assembly being coupled to said needle assembly, said marking assembly being adapted for putting an identifying mark on the animal around the area where said needle assembly pierced the hide of the animal when the medication has been administered to the animal for indicating the area where said needle assembly pierced the hide of the animal.

* * * * *